United States Patent
Hahn et al.

(10) Patent No.: US 11,353,855 B1
(45) Date of Patent: Jun. 7, 2022

(54) CONFIGURING AND DEPLOYING GATEWAY CONNECTORS AND WORKFLOWS FOR DATA SOURCES AT CLIENT NETWORKS

(71) Applicant: Amazon Technologies, Inc., Seattle, WA (US)

(72) Inventors: Pascal Hahn, Berlin (DE); Jeffrey C. Maynard, Boston, MA (US); Arie Leeuwesteijn, Papendrecht (NL); Matthew Patrick Herscovitch, Oakland, CA (US); Bart Schouwenaars-Harms, Henley-on-Thames (GB)

(73) Assignee: Amazon Technologies, Inc., Seattle, WA (US)

( * ) Notice: Subject to any disclaimer, the term of this patent is extended or adjusted under 35 U.S.C. 154(b) by 242 days.

(21) Appl. No.: 16/714,392

(22) Filed: Dec. 13, 2019

(51) Int. Cl.
*H04L 29/08* (2006.01)
*G05B 19/418* (2006.01)
*H04L 67/1042* (2022.01)

(52) U.S. Cl.
CPC ... *G05B 19/41865* (2013.01); *G05B 19/4185* (2013.01); *G05B 19/41845* (2013.01); *H04L 29/08315* (2013.01)

(58) Field of Classification Search
CPC .............................. H04L 63/1433; H04L 63/20
See application file for complete search history.

(56) References Cited

U.S. PATENT DOCUMENTS

| | | | |
|---|---|---|---|
| 9,516,141 B2 | 12/2016 | Dubois et al. | |
| 9,866,635 B2 | 1/2018 | Maturana et al. | |
| 2015/0365438 A1* | 12/2015 | Carver | H04L 41/0816 726/1 |
| 2017/0126345 A1* | 5/2017 | Testicioglu | H04J 3/0658 |
| 2018/0018463 A1* | 1/2018 | Grossman | A63F 13/75 |
| 2019/0098113 A1* | 3/2019 | Park | H04L 41/12 |

* cited by examiner

*Primary Examiner* — Zhiren Qin
(74) *Attorney, Agent, or Firm* — Robert C. Kowert; Kowert, Hood, Munyon, Rankin & Goetzel, P.C.

(57) ABSTRACT

An OT-IT (operational technology-information technology) service of a provider network allows operators to configure gateway connectors for data sources (e.g., machines at an industrial site) and allows developers to specify workflows that consume data from the data sources. To do so, the OT-IT service provides an operator interface to receive topology data for the client's remote network. The OT-IT service configures connectors for data sources based on the topology data and deploys the connectors to gateway devices. The OT-IT service also provides a developer interface to present available data sources and to receive specifications for workflows that consume data from the data sources. The OT-IT service deploys the workflows to execution locations. The OT-IT service then configures the gateways to send tagged data from the connectors to the workflows for processing.

20 Claims, 8 Drawing Sheets

CONFIGURING AND DEPLOYING GATEWAY CONNECTORS AND WORKFLOWS FOR DATA SOURCES AT CLIENT NETWORKS

BACKGROUND

Operators of various types of machines and equipment in industrial manufacturing plants may need to manage OT-IT (operational technology-information technology) gateways that provide functionalities such as field bus conversions, data aggregation, data transformations, and data filtering. The functionalities may also include data subsampling and data enrichment techniques.

It can be difficult for developers to create applications to efficiently obtain data from the gateways. For example, to consume data from these gateways, developers may need to work with various IT teams in order to get access to predefined data subsets and then process those data subsets in separate computing environments. Moreover, it may be difficult for machine operators and other operations personnel to control access to different types of data generated by various machines at an industrial site.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for configuring and deploying gateway connectors and workflows for data sources at client networks. Embodiments may allow an OT-IT (operational technology-information technology) service of a provider network to implement efficient and user-friendly techniques for operators to provide data to workflow developers and for the workflow developers to configure and deploy workflows.

Embodiments improve upon traditional techniques by reducing the time required to develop workflows, reducing errors associated with providing data from data sources, and reducing the amount of coordination/communication required between various personnel to obtain and process data from various data sources (e.g., industrial equipment, sensors, etc.). As used herein, a workflow may be any type of software application (e.g., code) that can be used to obtain and/or process data provided by one or more data sources.

As used herein, a remote network (or client network) may be a network that is remote from the provider network. Therefore, data sent from/to the remote network to/from the provider network may be transmitted through one or more portions of the internet and/or another wide-area network in between the remote network and the provider network. In embodiments, a device on the remote network may be considered remote with respect to any devices on the provider network.

In various embodiments, any suitable security communication protocols may be used to protect data that is being sent between any devices and/or networks (e.g., provider network, remote networks, gateway devices, edge devices, etc.) based on service credentials and/or local credentials (e.g., one or more encryption keys) according to asymmetric and/or symmetric encryption techniques. For example, data of messages may be encrypted using SSL (secure socket layer), TLS (transport layer security), HTTPS (secure hypertext transfer protocol), and/or any other suitable network security protocol.

Figure 1:
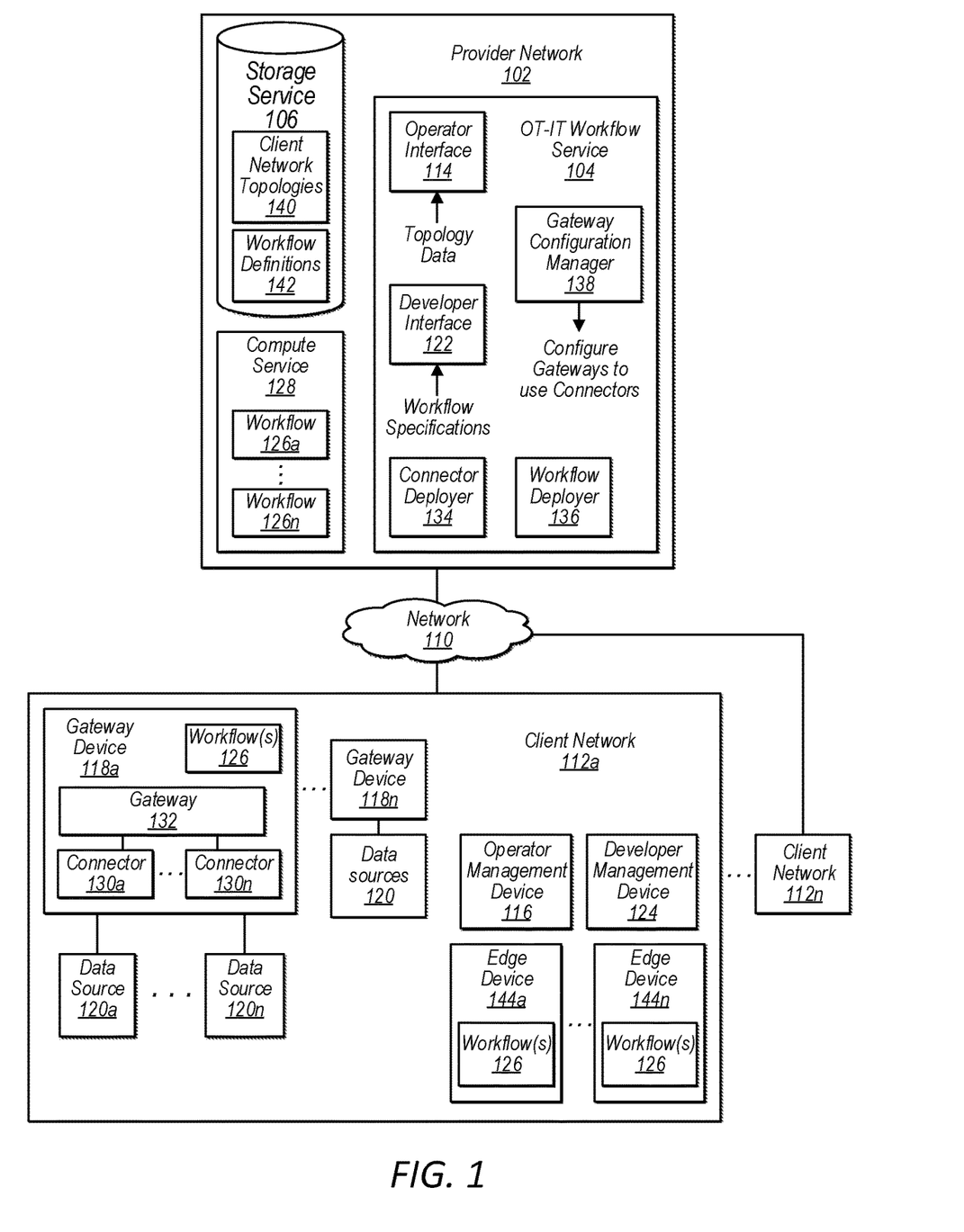
FIG. 1 illustrates a system for configuring and deploying gateway connectors and workflows for data sources at client networks, according to one embodiment.

FIG. 1 illustrates a system for configuring and deploying gateway connectors and workflows for data sources at client networks, according to one embodiment.

The example provider network 102 includes an OT-IT workflow service 104, a storage service 106, and a compute service 108. In embodiments, the provider network may include any other number of services that provide at least some of the functionality described herein for various services, networks, and devices. As depicted, a wide-area network 110 (e.g., the internet) may allow for communication of data between the provider network 102 and any number of remote client networks 112 (e.g., different networks that are owned/managed by different clients of the provider network).

As shown, the OT-IT workflow service 104 includes an operator interface 114 that an operator (e.g., an operator of a machine/equipment on the remote client network 112a of the client's site) may use to provide (via an operator management device 116) topology data to the OT-IT workflow service for a client's remote network. In embodiments, the topology data may indicate one or more gateway devices 118, one or more data sources 120 to provide data to respective ones of the one or more gateway devices, and information describing the one or more data sources (e.g., network address, location, type of the data source) or data produced by the one or more data sources (e.g., type, range, and/or format of the data). As discussed below, any given edge device of the client network may be used as a gateway device (e.g., by installing a gateway process onto the edge device).

In embodiments, the topology data may include any other data that describes the physical topology of the client site and/or network. For example, machines, structures, an assembly line, an organizational topology, and/or any other physical objects located at the client site may be included in the topology data (even though a given machine or structure may not be considered a part of the client network).

As discussed below, the topology data may be used to configure one or more connectors that are to communicate with the data sources. In embodiments, the topology data may indicate a group of two or more data sources that are to be used to create a "virtual connector." In various embodiments, the topology data may indicate any number of virtual connectors, which are discussed in more detail below.

In some embodiments, the OT-IT workflow service may assign, based on input from an operator, different permissions for different developers. A given permission assigned for a developer may indicate a subset of the data sources (e.g., less than all of the data sources), that are available for the developer to indicate for workflow specifications. This may provide flexibility for the operator to allow different developers access to different data sources/machines for building workflows, depending on the level of trust that the operator has for the different developers.

As depicted, the OT-IT workflow service 104 includes a developer interface 122. In embodiments, the developer interface may present availability information that indicates to a developer (e.g., via the developer management device 124) at least a portion of the data sources 120 that are available to provide data to workflows 126 specified/created by the developer. As discussed above, which data sources are available for a particular developer to indicate for workflow specifications may depend on the permission assigned by the operator to the developer. Therefore, the developer interface may present to the developer, based on the given permission assigned for the developer, the subset of the data sources that are available for the developer to indicate for workflow specifications.

In various embodiments, the developer interface may present any number of remaining data sources that are currently unavailable for the developer to indicate for workflow specifications, but could be made available to the developer if the developer is granted permission/access for those data sources. One or more different indications (e.g., graphical indications) may be presented along with the currently available data sources that are different than those presented along with the currently unavailable data sources. For example, a graphical representation of the available resources may be displayed in a different color and/or or different font than the currently unavailable resources. This may allow a developer to easily distinguish what data source(s) are currently available and which data source(s) are not currently available but are potentially available (if access were granted).

In embodiments, a developer may request access to one or more of the remainder of data sources that are currently unavailable to the developer (e.g., by submitting a request for access to the data source(s) via the developer interface). In embodiments, the request for access to a given data source may be received by an operator and subsequently approved or denied by the operator. In some embodiments, the operator may configure rules that may determine whether to automatically grant or deny the developer access (e.g., based on which other data sources the developer currently has access to and/or based on a group/organization that the developer belongs to). For example, if a developer currently has access to another data source on the same assembly line, then the service may automatically grant access. As another example, if other developers in the same group have access to the data source, then the service may automatically grant access.

In some embodiments, available and currently unavailable connectors may be presented to a developer instead of or in addition to the available and currently unavailable data sources. Thus, all of the currently configured and/or deployed connectors may be presented to a developer as available or currently unavailable connectors. In embodiments, a developer may indicate one or more connectors that a workflow is to consume data from, in the same or similar way as discussed herein for data sources.

In embodiments, the developer interface receives from a developer (e.g., via the developer management device or other local/remote device) one or more workflow specifications for one or more workflows 126, wherein a given specification for one of the workflows indicates one or more of the available data sources (e.g., presented as available to the developer) that the workflow 126 is to consume data from. In embodiments, the specification may indicate a group of data sources (corresponding to a "virtual connector" described below) that are to behave as one data source (e.g., one "connector").

In some embodiments, the developer interface may also receive from the developer indications of one or more workflow execution locations to deploy one or more workflows to. For example, the developer may indicate that one workflow is to be deployed to a particular device at the client network, another two workflows are to be deployed to a different device at the client network, and yet another workflow is to be deployed to a location on the provide network (e.g., to a compute service 128).

At some point, after the operator has finished providing topology data for one or more data sources, the OT-IT workflow service 104 may configure, based on the topology data, one or more connectors 130 for a respective one or more data sources 120. In embodiments, a given connector is configured to tag data obtained from a particular data source with metadata descriptive of the data source or descriptive of the obtained data. In embodiments, the metadata may be used by one or more entities (e.g., a gateway process 132, a workflow) to determine where to route the tagged data (e.g., one or more workflow execution locations) and/or what type of processing to perform on the tagged data.

As shown, a connector deployer 134 may deploy the one or more configured connectors to one or more gateway devices 118 (e.g., each connector is deployed to the gateway device that receives data from the data source corresponding to the connector). In some embodiments, the connector deployer 134 deploys one or more connectors to each appropriate gateway device based at least on location information of the gateway device (e.g., network address) and/or location information of the data sources (e.g., network address). For example, since the topology data provided by the operator indicates which data source provides data to which gateway device, then the OT-IT workflow service may deploy a connector that was configured for a particular data source to the gateway device that the data source provides data to (e.g., using the network address and/or another identifier for the gateway device).

As depicted, a workflow deployer 136 may deploy the one or more workflows to one or more workflow execution locations. For example, the workflow deployer may deploy the one or more workflows specified by the developer to the one or more workflow execution locations indicated by the developer. In some embodiments, some or all of the workflows may be intelligently deployed by the OT-IT workflow service to one or more workflow execution locations, as described for FIG. 2.

In embodiments, after the connectors are deployed to the appropriate gateway devices, the gateway configuration manager 138 at the OT-IT workflow service configures the gateways to use the connectors. For each gateway device, the gateway configuration manager may send configuration information to configure a gateway process (e.g., executing on the gateway device) to send tagged data received from at least one of the connectors to at least one of the workflow execution locations for processing by at least one of the workflows, as described in FIG. 3.

As shown, the OT-IT workflow service may also include client network topologies 140 and workflow definitions 142. In embodiments, the client network topologies 140 may store topology data provided by the operator via the operator interface (e.g., for any number of different clients). As discussed herein, the developer interface may present to a developer at least a portion of the topology data (e.g., based on permission for the developer). In embodiments, at least some of the topology data may presented in a graphical form (e.g., a graphical representation of various network components showing relationships/connections between the components).

In embodiments, the workflow definitions 142 may include code and/or specifications for one or more workflows provided by one or more developers (e.g., for any number of different clients). The workflow deployer may obtain workflow code from the workflow definitions 142 to deploy the workflow to one or more locations. As shown, a workflow may also be deployed to any other edge device 144 of a client network. In some embodiments, a developer may retrieve a workflow specification/code from the workflow definitions 142, modify it (e.g., changing code and/or functionality), and save the modified workflow as a new workflow and/or replace the existing workflow. The developer may then cause the new workflow or modified workflow to be deployed as discussed herein.

As mentioned above, in embodiments an edge device 144 may also serve as a gateway device. Therefore, in various embodiments, a gateway device is not necessarily separate and distinct from an edge device. For example, a gateway application/process may be installed on the edge device 144a, along with any number of connectors that communicate with respective data sources that provide data to the edge device 144a.

In some embodiments, any number of gateway processes 132 and corresponding connector(s) may by installed on a gateway device and/or on a virtual machine (VM) hosted at the provider network 102. For example, a gateway process 132 and multiple connectors may be installed onto a computing device or onto a VM provided by the compute service 128. In embodiments, each of the connectors may receive data from a corresponding data source at the remote client network 112 (e.g., via the network 110). Therefore, in embodiments, any number of gateway devices and/or gateway processes may be hosted in the cloud (e.g., provider network 102) instead of hosted at the client network itself.

In embodiments, any number of gateway processes 132 and corresponding connector(s) may by installed on a machine itself (e.g., without the need to install the gateway process/connectors on a separate gateway device/edge device). For example, a gateway process 132 and multiple connectors may be installed onto a machine on an assembly line that includes one or more different data sources (e.g., sensors). In embodiments, the machine may include sufficient compute capacity to host the gateway processes 132 and any number of corresponding connectors that obtain data from any number of data sources at the machine or connected to the machine.

Figure 2:
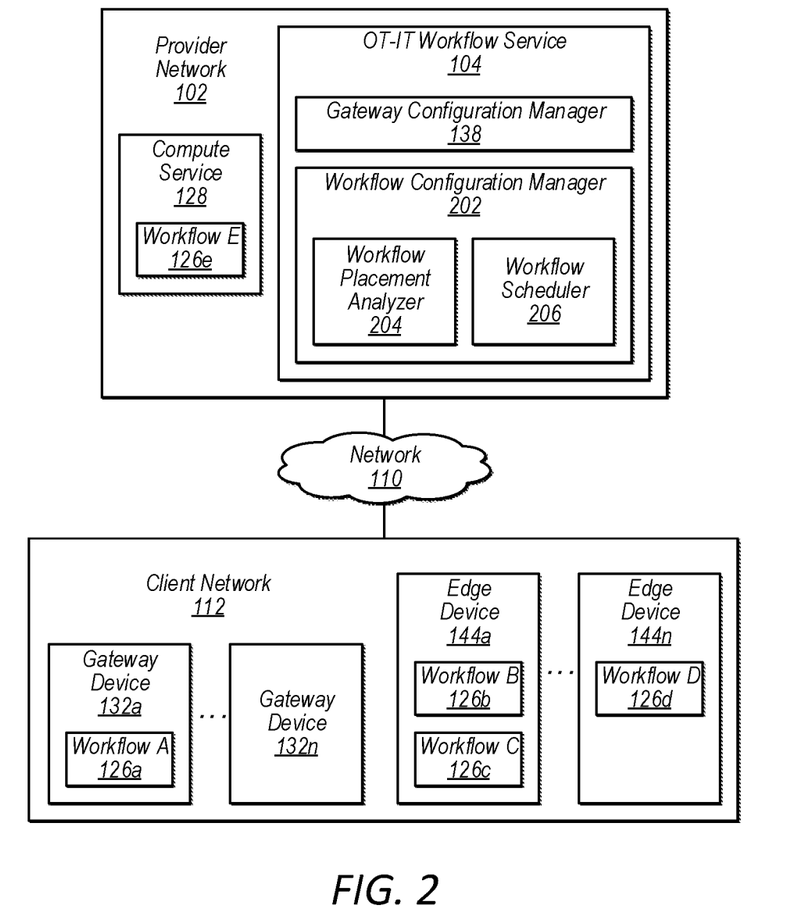
FIG. 2 illustrates a system for configuring and deploying gateway connectors and workflows for data sources at a client network, according to one embodiment.

FIG. 2 illustrates a system for configuring and deploying gateway connectors and workflows for data sources at a client network, according to one embodiment.

As depicted, the OT-IT workflow service 104 may also include a workflow configuration manager 202, which includes a workflow placement analyzer 204 and a workflow scheduler 206. In embodiments, the workflow placement analyzer 204 may intelligently deployed some or all of the workflows to one or more workflow execution locations (e.g., locations or network addresses of computing devices capable of executing the workflows).

In embodiments, the workflow placement analyzer 204 may receive, from the remote network, capacity information that indicates an available capacity of one or more of the gateway devices and/or one or more edge devices to execute the one or more workflows (e.g., an available amount of compute capacity to execute one or more workflows). The workflow placement analyzer 204 may determine, based on the received capacity information, that one or more workflow execution locations have at least a threshold amount of available capacity to execute the one or more workflows. In response, the workflow deployer may deploy one or more workflows to the one or more workflow execution locations.

As shown, based on the received capacity information, the workflow deployer deployed workflow A 126a to the gateway device 132. Based on the received capacity information, the workflow deployer deployed workflows B and C 126b, 126c to the edge device 144a and workflow D 126d to edge device 144n. Based on the received capacity information, the workflow deployer deployed workflow E 126e to the compute service 126e. In embodiments, any number of workflows may be deployed to any number of workflow execution locations, depending on the received capacity information.

In embodiments, a different candidate resource tag may be assigned (e.g., by the OT-IT workflow service) to each type of resource (e.g., type of gateway device, type of edge device, or type of other resource) that is a candidate location for executing workflows. In embodiments, a "type" of resource may include a particular system configuration of the resource (e.g., brand/type or processor, type/size of memory/storage space, amount of available capacity to execute workflows, VM, resource of an assembly line machine, etc.)), a location of the device (e.g., on a particular assembly line, a particular area/room of a floor, at a VM of the provider network), and/or a group of devices that the device is a assigned to (e.g., edge devices belonging to organization such as the IT team). In embodiments, a "type" of resource may include any other category that a resource may belong to or be classified as. Therefore, different resources may belong to different categories. In embodiments, an operator, developer, or the OT-IT service may assign each resource as a particular type of resource (any number of different types may be assigned).

In some embodiments, the OT-IT service may receive, via the developer interface, one or more candidate resource tags (e.g., via a selection from a list of available types of resources or any other input). This allows a developer to control what type of resource will be used to execute a given workflow. In embodiments, the service may determine, based on available capacity information (e.g., received from gateway and/or edge devices) and one or more candidate resource tags (e.g., types of resources indicated by a developer), that one or more workflow execution locations are candidate locations and also have at least a threshold amount of available capacity to execute the one or more workflows. For example, the service may determine that a particular edge device matches the desired resource type and also has at least a threshold amount of available capacity to execute a particular workflow. Therefore, the service may deploy the particular workflow to that edge device.

In some embodiments, the workflow scheduler 206 may schedule execution of workflows based on current and/or predicted available capacity. As discussed above, the service may receive, from the remote network, capacity information that indicates an available capacity of one or more of the gateway devices and/or one or more edge devices to execute the one or more workflows (e.g., an available amount of compute capacity to execute one or more workflows). The workflow scheduler 206 may determine, based on the received capacity information and/or predicted available capacity, a schedule for executing some or all of the workflows (e.g., at different times or in an order with respect to each other). This may be especially useful if a large number of workflows are deployed to the same workflow execution location.

Figure 3:
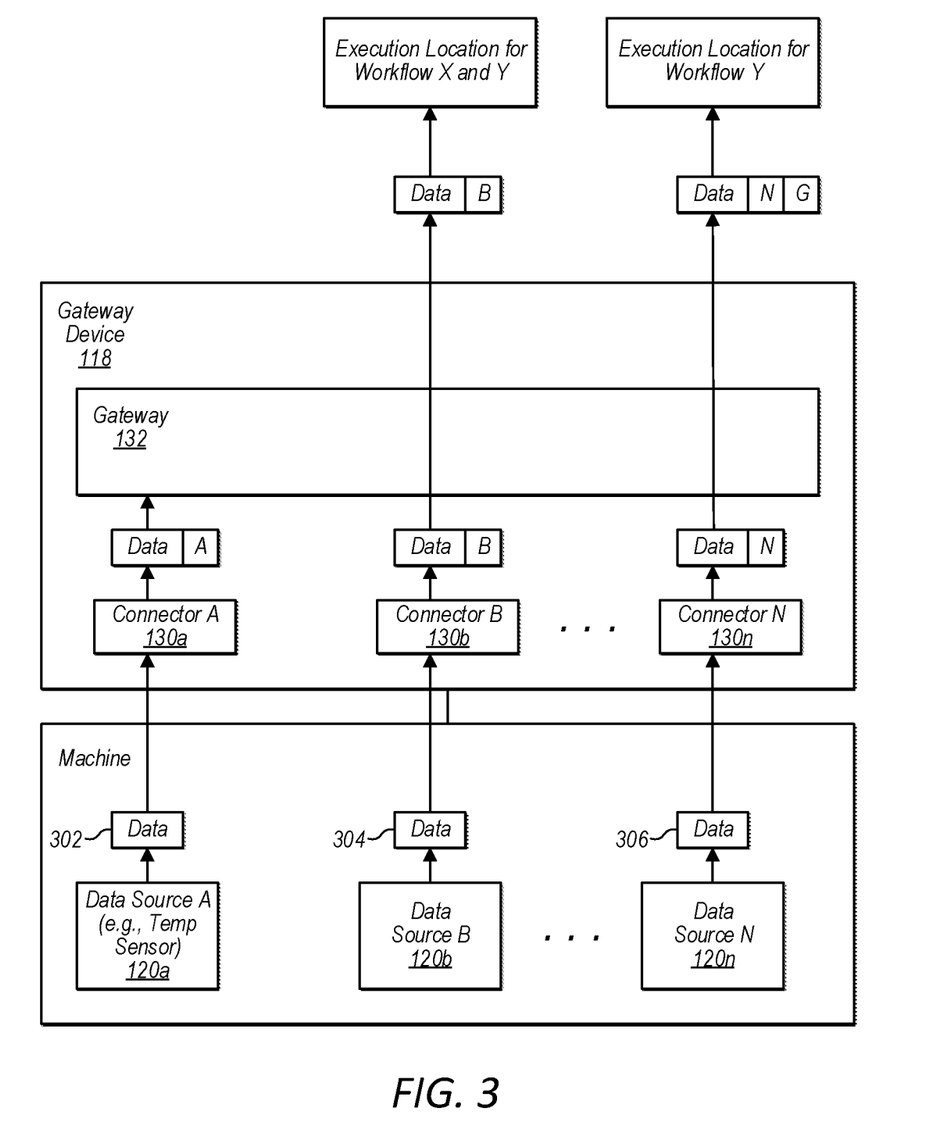
FIG. 3 illustrates a gateway device using connectors to tag data from data sources and sending the tagged data to workflow execution locations, according to one embodiment.

FIG. 3 illustrates a gateway device using connectors to tag data from data sources and sending the tagged data to workflow execution locations, according to one embodiment.

As shown, connector A 130a may obtain data 302 from data from source A 120a and tag the data with metadata "A" (e.g., metadata descriptive of the data source or descriptive of the obtained data, such as a unique identifier of the data source). Similarly, connector B 130b may obtain data 304 from data from source B 120b and tag the data with metadata "B." Connector N 130n may obtain data 306 from data from source N 120n and tag the data with metadata "N."

In embodiments, a connector may perform one or more operations/processing techniques on the data collected from a data source in order to transform the data before it is sent to the gateway process and/or to a workflow execution location. For example, the data may be aggregated over one or more time intervals (e.g., minimum, maximum, average, floating average, moving average) to transform the data. In some embodiments, this may smooth out the data by removing outlier measurements. In embodiments, the data from the data source may be sampled at a particular rate to produce the transformed data.

In some embodiments, the gateway process itself may perform some or all of the above processing for data received from a connector instead of the connector itself.

In embodiments, a gateway process may process a portion of the tagged data received from a data source according to a processing technique (e.g., sample the tagged data at a particular rate) to generate a processed portion of tagged data. The gateway process may send that processed portion of tagged data to one or more workflow execution locations. The gateway process may process another portion of the tagged data received from the same data source according to another processing technique (e.g., sample the tagged data at a different rate) to generate another processed portion of tagged data. The gateway process may send the other processed portion of tagged data to one or more other workflow execution locations.

By performing transformation operations on the data collected from a data source, the amount of data to send over the network to the workflow execution locations may be greatly reduced. Therefore, fewer network resources are used to transmit data. Moreover, the data arrives at the workflow execution destinations faster. In some embodiments, the metadata tag may identify the type of processing/transformation performed on the data (e.g., type of aggregated data—sampled at a particular sampling rate, averaged, maximum value during a particular time interval, etc.).

In the depicted embodiment, based on permission data provided by an operator, the gateway does not send tagged data from data source A to be sent to any workflows. In other words, even though connector A has been deployed, no workflows have been deployed that consume data from data source A (e.g., due to no permissions given for developers or simply due to no workflows deployed that consume that data).

As depicted, based on specifications provided for workflow X and for workflow Y, the gateway sends tagged data from data source B to the execution locations of workflow X and workflow Y. As shown, based on the specification provided for workflow Y, the gateway sends tagged data from data source N to the execution location of workflow Y. In various embodiments, a gateway may be configured (based on any number of workflow specifications) to send tagged data from one or more data sources to any number of workflow execution locations. In embodiments, data source N may not have been available for the developer for workflow X, preventing that developer from creating a workflow to consume data from data source N.

In the example embodiment, the gateway also tags the data 306 with metadata ("G") before sending the data to the execution location of workflow Y. Thus, in embodiments, the operator may configure the gateway to add additional tag(s) to data (e.g., to uniquely identify the gateway process and/or gateway device that provided the data).

In embodiments, the data provided by two or more connectors may be grouped to form one "virtual" connector that behaves as one connector that provides the data of the two or more connectors. For example, the OT-IT workflow service may configure (e.g., based on input via the operator interface) a virtual connector that sends data from connector A 130a, connector B 130b, and connector N 130n to the virtual connector ("connector V") and tags that data with a metadata tag that uniquely identifies data provided by the virtual connector.

In embodiments, a developer may specify the virtual connector as a data source (e.g., by referencing the virtual connector tag in a data query for a workflow) instead of specifying all three connectors (e.g., via three different tags) or instead of specifying all three data sources separately. In embodiments, other workflows may continue to obtain tagged data from the individual connectors themselves (e.g., based on workflow queries that reference the individual metadata tags A, B, or N).

In embodiments, after a given workflow processes data, the workflow may store the processing results at a particular destination or send the results to another location for storage (e.g., a time series database, a supervisory control and data acquisition (SCADA) system, or other storage system/database). In some embodiments, the results may indicate whether a machine is operating within a threshold for one or more operating parameters (e.g., temperature, failure rate, etc.). The results may be accessed by a user or an application, which may determine, based on the results, whether the machine needs to be serviced or replaced. For example, if a machine is operating above or below one or more specified operation parameters (e.g., temperature is above a threshold), then the machine may need to be evaluated and/or serviced.

In some embodiments, the gateway process may receive, from the service, an indication of additional workflow execution locations to send the tagged data to (e.g., at some time after the gateway process has already sent data from one or more data sources to one or more workflow execution locations). For example, the service may have recently deployed new workflows to additional locations based on new workflows recently specified by developers. The gateway configuration may be updated to send data to these new locations. When additional tagged data is received from one or more connectors by the gateway process, the gateway process may send the additional tagged data to the original workflow execution locations as well as the additional workflow execution locations. Therefore, at any point in time, the configuration of the gateway process may be updated based on newly deployed workflows.

In embodiments, when the gateway process 132 receives one or more connectors from the OT-IT service, it installs the connectors. Each connector may be configured by the gateway process to obtain and/or process data from a particular data source that the connector is assigned to and to tag the obtained data with metadata descriptive of the data source and/or descriptive of the obtained data. The gateway process may also receive, from the OT-IT service, an indication of one or more workflow locations to send the tagged data to.

After installation/configuration of the connectors at the gateway device, the gateway process may send, based on metadata from a particular connector (e.g., description of the data source and/or the obtained data), at least a portion of the tagged data obtained from a particular data source to a workflow execution location(s). Likewise, the gateway process may send, based on metadata from a different connector, another portion of the tagged data obtained from a different data source to a different workflow execution location(s).

In various embodiments, developers may provide specifications for workflows that each indicate one or more of the data sources (and/or connectors) that the workflow is to consume data from. In embodiments, the specifications may define rules to apply to the data to be consumed. For example, a specification may define a rule to filter data from a data sources based on the metadata tag (e.g., description of the data source and/or the obtained data) or based on attributes of the data itself (e.g., attributes of the tagged data received at the gateway process from the connector).

As an example, a developer may define a rule for a particular workflow to obtain all data from temperature sensors on a particular assembly line. In this case, the gateway process for each gateway device on that assembly line may be configured by the OT-IT service to send any data tagged as originating from a temperature sensor (or tagged as temperature data) to the workflow. In embodiments, a developer may define a rule for a particular workflow to sample all data from pressure sensors on a particular machine at a particular sampling rate. In this case, the gateway process for a gateway device for that machine may be configured by the OT-IT service to sample any data tagged as originating from a pressure sensor (or tagged as pressure data) at the particular sampling rate and sending the sampled data to the workflow.

Figure 4:
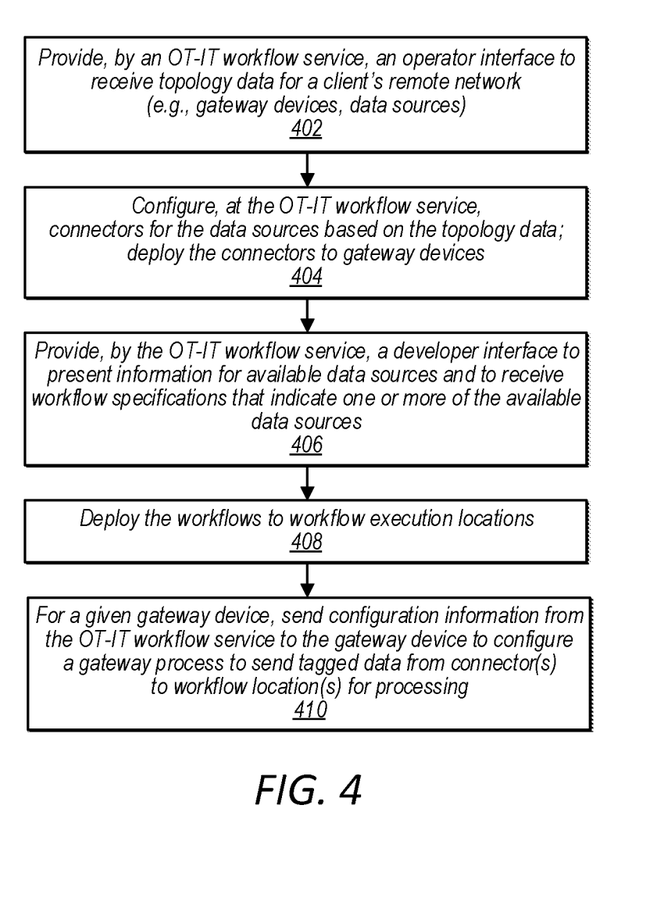
FIG. 4 is a flowchart illustrating a method for configuring and deploying gateway connectors and workflows for data sources at client networks, according to one embodiment.

FIG. 4 is a flowchart illustrating a method for configuring and deploying gateway connectors and workflows for data sources at client networks, according to one embodiment.

At block 402, the OT-IT workflow service provides an operator interface to receive topology data for a client's remote network (e.g., gateway devices, data sources). At block 404, the OT-IT workflow service configures connectors for the data sources based on the topology data and deploy the connectors to gateway devices.

At block 406, the OT-IT workflow service provides a developer interface to present information for available data sources and to receive workflow specifications that indicate one or more of the available data sources. At block 408, the OT-IT workflow service deploys the workflows to the workflow execution locations. At block 410, for a given gateway device, the OT-IT workflow service sends configuration information from the OT-IT workflow service to the gateway device to configure a gateway process to send tagged data from connector(s) to workflow location(s) for processing.

Figure 5:
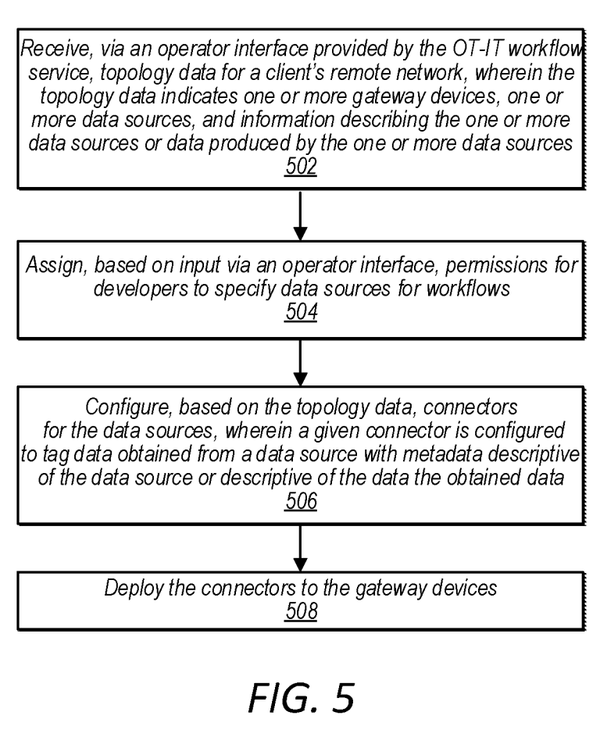
FIG. 5 is a flowchart illustrating a method for configuring and deploying gateway connectors for data sources at a client network, according to one embodiment.

FIG. 5 is a flowchart illustrating a method for configuring and deploying gateway connectors for data sources at a client network, according to one embodiment.

At block 502, the OT-IT workflow service receives, via an operator interface, topology data for a client's remote network, wherein the topology data indicates one or more gateway devices, one or more data sources, and information describing the one or more data sources or data produced by the one or more data sources. At block 504, the OT-IT workflow service assigns, based on input via an operator interface, permissions for developers to specify data sources for workflows.

At block 506, the OT-IT workflow service configures, based on the topology data, connectors for the data sources, wherein a given connector is configured to tag data obtained from a data source with metadata descriptive of the data source or descriptive of the data the obtained data. At block 508, the OT-IT workflow service deploys the connectors to the gateway devices.

Figure 6:
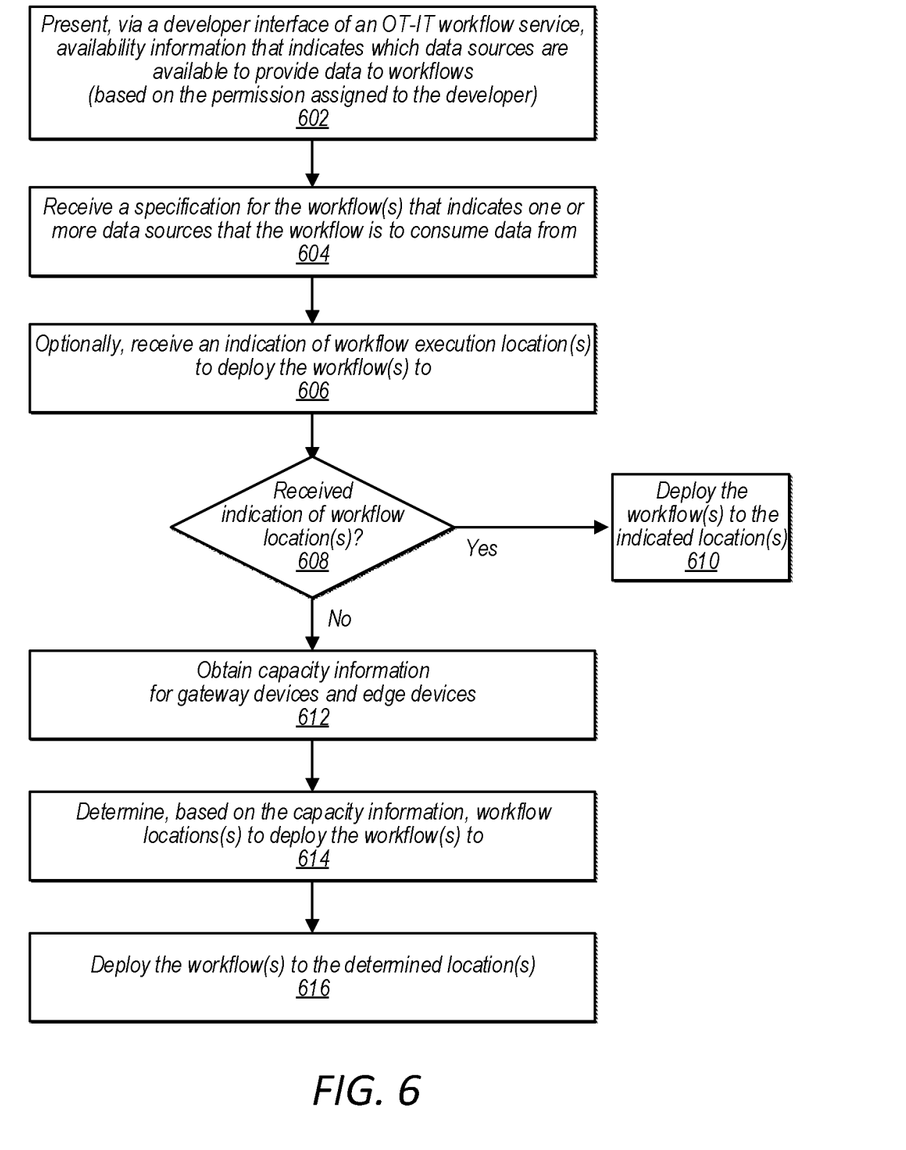
FIG. 6 is a flowchart illustrating a method for configuring and deploying workflows to one or more locations, according to one embodiment.

FIG. 6 is a flowchart illustrating a method for configuring and deploying workflows to one or more locations, according to one embodiment.

At block 602, the OT-IT workflow service presents, via a developer interface of an OT-IT workflow service, availability information that indicates which data sources are available to provide data to workflows (based on the permission assigned to the developer). At block 604, the OT-IT workflow service receives a specification for the workflow(s) that indicates one or more data sources that the workflow is to consume data from.

At block 606, the developer may optionally provide an indication of workflow execution location(s) to deploy the workflow(s) to. At block 608, the OT-IT workflow service determines whether the developer provided an indication of one or more workflow locations to deploy one or more workflows to. If so, then at block 610, the OT-IT workflow service deploys the one or more workflows to the indicated locations.

If not, then at block 612, the OT-IT workflow service obtains capacity and/or topology information for one or more gateway devices and/or edge devices of the remote network (e.g., an amount of available capacity of each device for executing one or more of the workflows and/or description of each device, such as network address/location). In some embodiments, the OT-IT workflow service may already have this capacity information and/or topology information that was previously collected from the remote network (e.g., on a scheduled or periodic basis). Therefore, in embodiments, the service may receive the capacity and/or topology information from the gateway devices and/or edge devices asynchronously with respect to receiving specifications for workflows.

At block 614, the OT-IT workflow service determines, based on the capacity and/or topology information, workflow locations(s) to deploy the workflow(s) to. For example, one or more workflows may be deployed to one or more gateway or edge device(s) with the largest amount of available capacity. At block 616, the OT-IT workflow service deploys the workflow(s) to the determined location(s).

Figure 7:
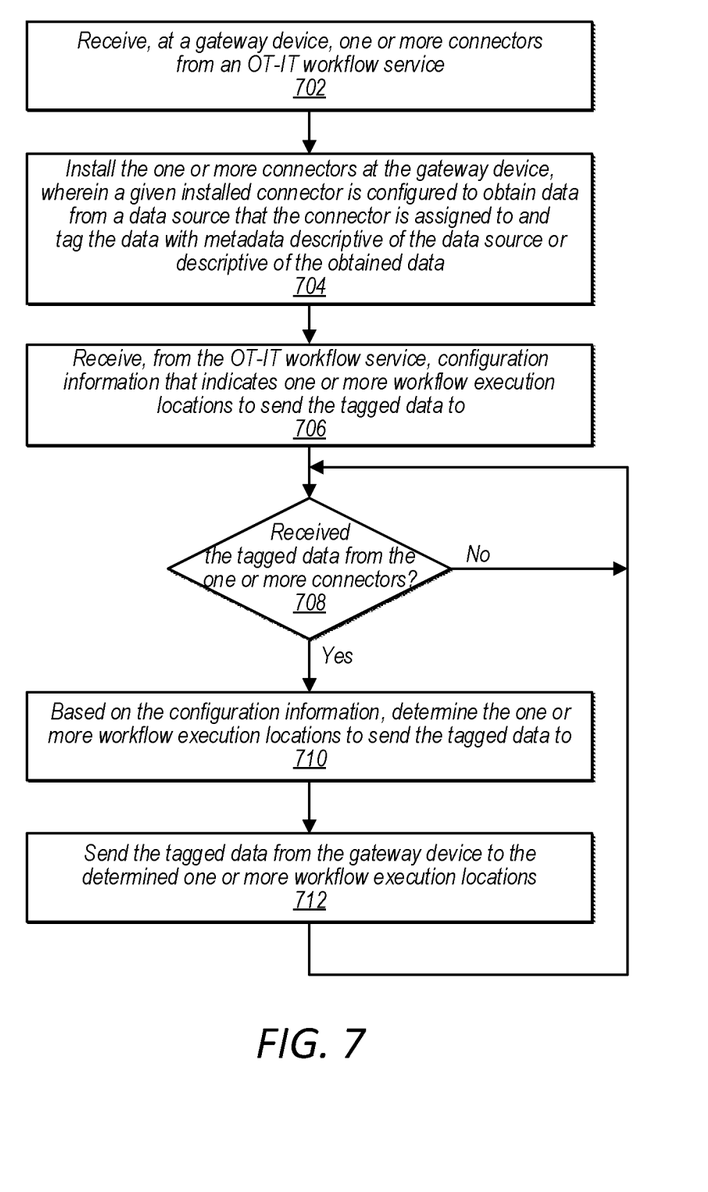
FIG. 7 is a flowchart illustrating a method for installing connectors at a gateway device and sending tagged data to one or more workflow execution locations, according to one embodiment.

FIG. 7 is a flowchart illustrating a method for installing connectors at a gateway device and sending tagged data to one or more workflow execution locations, according to one embodiment. In embodiments, a gateway process running on the gateway device may perform some or all of the blocks described below.

At block 702, the gateway device receives one or more connectors from an OT-IT workflow service. At block 704, the gateway device installs the one or more connectors at the gateway device, wherein a given installed connector is configured to obtain data from a data source that the connector is assigned to and tag the data with metadata descriptive of the data source or descriptive of the obtained data.

At block 706, the gateway device receives, from the OT-IT workflow service, configuration information that indicates one or more workflow execution locations to send the tagged data to. At block 708, the gateway device determines whether any tagged data has been received from the one or more connectors. If not, then the process waits for at least a threshold period of time before checking whether any tagged data has been received.

At block 708, if the gateway device determines that tagged data has been received from the one or more connectors, then at block 710, based on the configuration information, the gateway device determines the one or more workflow execution locations to send the tagged data to. For example, data tagged with metadata "A" may be sent to one or more particular locations, whereas data tagged with metadata "B" may be sent to one or more different locations and/or some of the same locations. At block 712, the gateway device sends the tagged data to the determined one or more workflow execution locations.

Any of various computer systems may be configured to implement processes associated with the provider network, device management service, repository, network manager, or any other component of the above figures. For example, FIG. 8 is a block diagram illustrating an example computer system that implements some or all of the techniques described herein, according to some embodiments.

Figure 8:
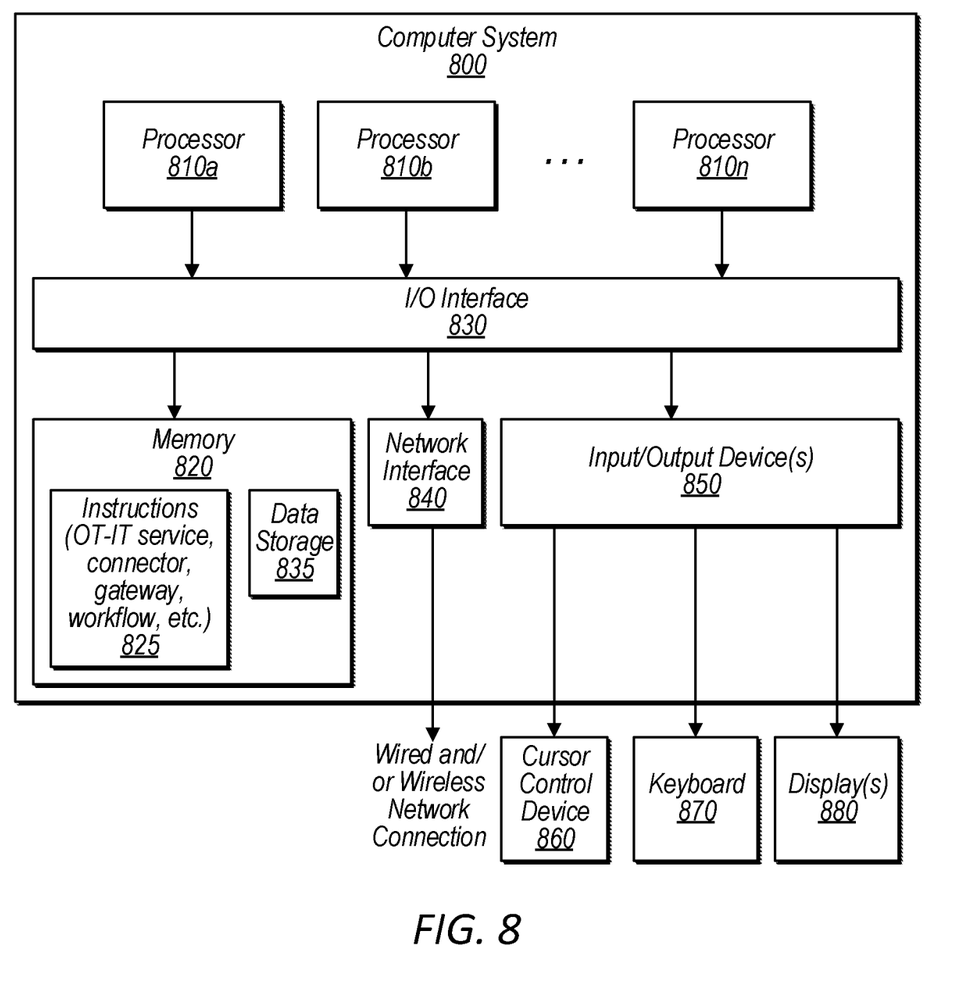
FIG. 8 is a block diagram illustrating an example computer system that implements some or all of the techniques described herein, according to some embodiments.

In various embodiments, the provider network, OT-IT workflow service, gateway, or any other component of any of FIGS. 1-7 may each include one or more computer systems 800 such as that illustrated in FIG. 8. In embodiments, the provider network, OT-IT workflow service, gateway, or any other component may include one or more components of the computer system 800 that function in a same or similar way as described for the computer system 800.

In the illustrated embodiment, computer system 800 includes one or more processors 810 coupled to a system memory 820 via an input/output (I/O) interface 830. Computer system 800 further includes a network interface 840 coupled to I/O interface 830. In some embodiments, computer system 800 may be illustrative of servers implementing enterprise logic or a downloadable application, while in other embodiments servers may include more, fewer, or different elements than computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be embedded processors implementing any of a variety of instruction set architectures (ISAs), such as the x106, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor 810. In various embodiments, system memory 820 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the provider network (e.g., OT-IT service, gateways, connectors), client devices/networks, or remote networks are shown stored within system memory 820 as program instructions 825. In some embodiments, system memory 820 may include data 835 which may be configured as described herein.

In one embodiment, I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computer system 800 and other computer systems 800 or devices attached to a network, such as the local network discussed above, a wide-area network, or a local network within the provider network, for example. In particular, network interface 840 may be configured to allow communication between computer system 800 and/or various I/O devices 850. I/O devices 850 may include scanning devices, display devices, input devices and/or other communication devices, as described herein. Network interface 840 may commonly support one or more wireless networking protocols (e.g., Wi-Fi/IEEE 802.11, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 800 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In some embodiments, I/O devices 850 may be relatively simple or "thin" client devices. For example, I/O devices 850 may be configured as dumb terminals with display, data entry and communications capabilities, but otherwise little computational functionality. However, in some embodiments, I/O devices 850 may be computer systems configured similarly to computer system 800, including one or more processors 810 and various other devices (though in some embodiments, a computer system 800 implementing an I/O device 850 may have somewhat different devices, or different classes of devices).

In various embodiments, I/O devices 850 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 850 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 800. In general, an I/O device 850 (e.g., cursor control device 860, keyboard 870, or display(s) 880 may be any device that can communicate with elements of computing system 800.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the provider network, OT-IT workflow service, gateway, other components, etc.).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   one or more processors; and
   one or more memories, wherein the one or more memories have stored thereon instructions, which when executed by the one or more processors, cause the one or more processors to implement an OT-IT (operational technology-information technology) workflow service for a plurality of clients, wherein the OT-IT workflow service is configured to:
   provide an operator interface configured to:
     receive topology data for a remote network of a given client, wherein the topology data indicates one or more gateway devices, one or more data sources to provide data to respective ones of the one or more gateway devices, and information describing the one or more data sources or data produced by the one or more data sources;
     configure, based on the topology data, one or more connectors for the respective one or more data sources, wherein individual ones of the connectors are configured to tag data obtained from the data source with metadata descriptive of the data source or descriptive of the obtained data;
   provide a developer interface configured to:
     present availability information that indicates at least a portion of the one or more data sources that are available to provide data to workflows; and
     receive respective workflow specifications for one or more workflows, wherein a given specification for one of the workflows indicates one or more of the portion of the data sources that the workflow is to consume data from;
   deploy at least one of the connectors to one or more respective ones of the one or more gateway devices;
   deploy the one or more workflows to one or more respective workflow execution locations; and
   for individual ones of the gateway devices, send configuration information to configure a gateway process to send tagged data from at least one of the connectors to at least one of the workflow execution locations for processing by at least one of the workflows.

2. The system of claim 1, wherein to receive respective specifications for one or more workflows, the developer interface is further configured to receive indications of the one or more respective workflow execution locations to deploy the one or more workflows to.

3. The system of claim 1, wherein the OT-IT workflow service is further configured to:

receive, via the developer interface, one or more candidate resource tags, wherein a given candidate resource tag indicates a type of resource that is a candidate location for executing workflows;
receive, from the remote network, capacity information that indicates an available capacity of one or more of the gateway devices or one or more edge devices to execute the one or more workflows; and
determine, based on the received capacity information and the one or more candidate resource tags, that the one or more respective workflow execution locations are candidate locations and have at least a threshold amount of available capacity to execute the one or more workflows.

4. The system of claim 1, wherein the operator interface is further configured to:
assign, based on input from an operator, different permissions for different developers, wherein a given permission assigned for a developer indicates a subset of the one or more data sources, less than the one or more data sources, that are available for the developer to indicate for workflow specifications.

5. The system of claim 4, wherein to present availability information that indicates at least a portion of the one or more data sources that are available to provide data to workflows, the developer interface is further configured to:
present to the developer, based on the given permission assigned for the developer, the subset of the one or more data sources as available for the developer to indicate for workflow specifications, wherein a remainder of the one or more data sources are presented to the developer as data sources that are currently unavailable for the developer to indicate for workflow specifications; and
receive, from the developer, a request for access to at least one of the remainder of the one or more data sources.

6. A method, comprising:
performing, by one or more computing devices that implement an OT-IT workflow service:
receiving topology data for a remote network of a client, wherein the topology data indicates one or more gateway devices, one or more data sources to provide data to respective ones of the one or more gateway devices, and information describing the one or more data sources or data produced by the one or more data sources;
configuring, based on the topology data, one or more connectors for the respective one or more data sources, wherein individual ones of the connectors are configured to tag data obtained from the data source with metadata descriptive of the data source or descriptive of the obtained data;
receiving respective workflow specifications for one or more workflows, wherein a given specification for one of the workflows indicates one or more of the data sources that the workflow is to consume data from;
deploying at least one of the connectors to one or more respective ones of the one or more gateway devices;
deploying the one or more workflows to one or more respective workflow execution locations; and
for individual ones of the gateway devices, sending configuration information to configure a gateway process to send tagged data from at least one of the connectors to at least one of the workflow execution locations.

7. The method as recited in claim 6, wherein receiving respective specifications for one or more workflows comprises:
receiving indications of the one or more respective workflow execution locations to deploy the one or more workflows to.

8. The method as recited in claim 6, further comprising:
receiving one or more candidate resource tags, wherein a given candidate resource tag indicates a type of resource that is a candidate location for executing workflows;
receiving, from the remote network, capacity information that indicates an available capacity of one or more of the gateway devices and one or more edge devices to execute the one or more workflows, and
determining, based on the received capacity information and the one or more candidate resource tags, that the one or more respective workflow execution locations are candidate locations and have at least a threshold amount of available capacity to execute the one or more workflows.

9. The method as recited in claim 6, further comprising:
assigning, based on input from an operator, different permissions for different developers, wherein a given permission assigned for a developer indicates a subset of the one or more data sources, less than the one or more data sources, that are available for the developer to indicate for workflow specifications.

10. The method as recited in claim 9, further comprising:
presenting to the developer, based on the given permission assigned for the developer, the subset of the one or more data sources as available for the developer to indicate for workflow specifications, wherein a remainder of the one or more data sources are presented to the developer as data sources that are currently unavailable for the developer to indicate for workflow specifications; and
receiving, from the developer, a request for access to at least one of the remainder of the one or more data sources.

11. The method as recited in claim 6, wherein the topology data includes a network address for the one or more gateway devices, and wherein deploying at least one of the connectors to one or more respective ones of the one or more gateway devices comprises:
deploying, based at least on the network address for the one or more gateway devices, at least one of the connectors to the one or more respective ones of the one or more gateway devices.

12. The method as recited in claim 6, wherein the topology data indicates, for individual ones of the one or more data sources, a type of hardware interface to communicate with the data source.

13. The method as recited in claim 12, wherein configuring, based on the topology data, one or more connectors for the respective one or more data sources comprises:
configuring the one or more connectors to obtain data from the respective one or more data sources using the type of hardware interface indicated in the topology data.

14. The method as recited in claim 6, further comprising, for one or more of the individual gateway devices:
deploying the gateway process to the gateway device.

15. One or more non-transitory computer-accessible storage media storing program instructions that when executed on or across one or more processors cause the one or more processors to implement a gateway process to:

install one or more connectors, received from an OT-IT workflow service, for one or more data sources, wherein individual ones of the connectors are configured to:
- obtain data from one of the data sources that the connector is assigned to; and
- tag the obtained data with metadata descriptive of the data source or descriptive of the obtained data;

receive, from the OT-IT workflow service, an indication of one or more workflow execution locations to send the tagged data to;

interface with the one or more connectors to receive the tagged data from the one or more data sources; and send the tagged data to the one or more workflow execution locations.

16. The one or more storage media as recited in claim 15, wherein to send the tagged data to the one or more workflow execution locations, the program instructions when executed on or across the one or more processors further cause the one or more processors to:

send, based at least on the metadata, a portion of the tagged data obtained from one of the data sources to a workflow execution location and send, based at least on the metadata, another portion of the tagged data obtained from another of the data sources to a different workflow execution location, wherein the portion of the tagged data from the data source is tagged with different metadata than the other portion of the tagged data from the other data source.

17. The one or more storage media as recited in claim 15, wherein the program instructions when executed on or across the one or more processors further cause the one or more processors to:

prior to sending at least a portion of the tagged data to the one or more workflow execution locations, tag at least the portion of the tagged data with metadata descriptive of the gateway process or a gateway device that hosts the gateway process.

18. The one or more storage media as recited in claim 15, wherein the program instructions when executed on or across the one or more processors further cause the one or more processors to:

process a portion of the tagged data received from one of the data sources according to a processing technique to generate a processed portion of tagged data;

send the processed portion of tagged data to one of the workflow execution locations;

process the portion of the tagged data received from one of the data sources according to another processing technique to generate another processed portion of tagged data; and send the other processed portion of tagged data to another of the workflow execution locations.

19. The one or more storage media as recited in claim 18, wherein the processing technique comprises sampling the portion of the tagged data at a sampling rate and the other processing technique comprises sampling the portion of the tagged data at a different sampling rate.

20. The one or more storage media as recited in claim 15, wherein the program instructions when executed on or across the one or more processors further cause the one or more processors to:

receive, from the OT-IT workflow service, an indication of additional workflow execution locations to send the tagged data to;

interface with the one or more connectors to receive additional tagged data from the one or more data sources; and send the additional tagged data to the one or more workflow execution locations and the additional workflow execution locations.

* * * * *